United States Patent
Murray et al.

(10) Patent No.: US 7,617,396 B2
(45) Date of Patent: Nov. 10, 2009

(54) METHOD AND APPARATUS FOR WATERMARKING BINARY COMPUTER CODE WITH MODIFIED COMPILER OPTIMIZATIONS

(75) Inventors: Eric Murray, Los Gatos, CA (US); Owen Robert Rubin, Oakland, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1203 days.

(21) Appl. No.: 10/223,205

(22) Filed: Aug. 16, 2002

(65) Prior Publication Data

US 2004/0034777 A1    Feb. 19, 2004

(51) Int. Cl.
*H04L 9/32* (2006.01)
*H04L 29/06* (2006.01)

(52) U.S. Cl. .................. 713/176; 713/152
(58) Field of Classification Search ......... 713/169–183, 713/152
See application file for complete search history.

(56) References Cited

U.S. PATENT DOCUMENTS

| | | | | |
|---|---|---|---|---|
| 4,399,467 A | * | 8/1983 | Subramaniam | 382/244 |
| 5,265,253 A | * | 11/1993 | Yamada | 717/160 |
| 5,559,884 A | | 9/1996 | Davidson et al. | |
| 5,636,292 A | * | 6/1997 | Rhoads | 382/232 |
| 6,026,193 A | * | 2/2000 | Rhoads | 382/232 |
| 6,683,546 B1 | * | 1/2004 | Torrubia-Saez | 341/51 |
| 6,834,343 B1 | * | 12/2004 | Burns | 713/176 |

OTHER PUBLICATIONS

Alan L. Cassel et al, Method for digitak watermarking of images and images produced thereby, (U.S. Appl. No. 10/195,233).*
C Collberg, C Thomborson, D Low—Proc. ACM Symp. on Principles of Programming Languages, 1999—cs.arizona.edu, On the limits of software watermarking.*
U Holzle, C Chambers, D Ungar—Proceedings of the ACM SIGPLAN, 1992, Debugging optimized code with dynamic deoptimization.*
K Ishizaki, M Kawahito, T Yasue, M Takeuchi, T . . . —Java Grande, 1999—portal.acm.org, Design, Implementation, and Evaluation of Optimizations in a Just-in-Time Compiler.*
RJ Anderson, FAP Petitcolas—Information Hiding, 1996—ftp.cl.cam.ac.uk, Stretching the Limits of Steganography.*
M Franz—Mobile Object Systems, 1996—ics.uci.edu, Adaptive Compression of Syntax Trees and Iterative Dynamic Code Optimization: Two Basic Technologies for Mobile-Object Systems.*
D Low—Crossroads, 1998—portal.acm.org, Protecting Java code via code obfuscation, C Collberg, S Jha, D Tomko, H Wang—cs.wisc.edu, Agust 31, 2001, UWStego: a General Architecture for Software Watemarking.*

(Continued)

*Primary Examiner*—David García Cervetti
*Assistant Examiner*—Mohammad W Reza
(74) *Attorney, Agent, or Firm*—Patterson & Sheridan, LLP

(57) ABSTRACT

A system and apparatus for inserting a watermark into a compiled computer program selectively replaces specified optimizations by non-optimized code to encode bit values of the watermark. The watermark is read by decoding the executable code and assigning the decoded bit values, determined by the presence or absence of optimized code, to bit positions in a signature.

15 Claims, 4 Drawing Sheets

OTHER PUBLICATIONS

LL Pollock, ML Soffa—POPL 1985—portal.acm.org, Incremental Compilation of Locally Optimized Code.*

A Monden, H Iida, K Matsumoto, K Inoue, K Toni—Proc IEEE Comput Soc Int Comput Software Appl Conf. pp. 191 . . . -2000—se.aist-nara.ac.jp, A Practical Method for Watermarking Java Programs.*

DF Bacon, SL Graham, OJ Sharp—ACM Computing Surveys, 1994, pp. 1 and 368-369—portal.acm.org, Compiler transformations for high-performance computing.*

Julien P. Stern et al, *Robust Object Watermarking: Application to Code*, presented at the 1999 Workshop on Information Hiding; online Mar. 2, 2000, 24 pages; retrieved from the internet on Sep. 3, 2002: <URL:http://www.julienstern.org/files/codemark/>.

John Lach et al, *Enhanced Intellectual Property Protection for Digital Circuits on Programmable Hardware*, presented at the 1999 Workshop on Information Hiding; 15 pages; retrieved from the Internet: <URL:http://citeseer.nj.nec.com/236547.html>.

John Lach et al, *Robust FPGA Intellectual Properly Protection Through Multiple Small Watermarks*; 6 pages; retrieved from the internet: <URL:http://citeseer.nj.nec.com/180592.html>.

* cited by examiner

Left box shows compiled code with no watermark, right side shows compiled code without optimization, indicating a watermarked data bit '1'.

METHOD AND APPARATUS FOR WATERMARKING BINARY COMPUTER CODE WITH MODIFIED COMPILER OPTIMIZATIONS

BACKGROUND OF THE INVENTION

It can be useful to be able to identify the code produced by different compilers to identify non-licensed uses of the compilers, and to track errors. Accordingly, compiler manufacturers require a method of including a serial number or other identifying mark in code produced by a compiler. Additionally, a method of analyzing a copy of the compiled code to determine the serial number or identifying mark is also required.

A private watermark, which is data hidden via steganography, is one method for tracking the outputs of licensed programs. However traditional steganography requires the presence of "low order" bits in the data stream. The low order bits can be changed without the data changing so much that a human can notice the difference. The changed bits, detected when the modified field is compared to the original, can hold the steganographic data. Since traditional stenography changes non-significant low-order bits, steganography is normally applied to digital pictures and sounds.

Steganography in computer code can't be done with the normal methods because computer code does not contain low-order bits. Every bit in the code is important, and flipping even one bit can prevent the code from operating correctly.

Accordingly, improved techniques for inserting identifying watermarks in compiled programs is needed.

BRIEF SUMMARY OF THE INVENTION

In one embodiment of the invention, a method for generating and auditing a watermark for a compiled computer program is provided. The watermark is an integral part of the program and does not appear as an external data item.

In another embodiment, a watermarking module selectively replaces n-optimized code segments with non-optimized code segments. For a current signature digit, the optimized code segment is replaced by a non-optimized code segment only if the signature digit has a first binary value. The presence of the optimized encode segment encodes the second binary value.

In another embodiment of the invention, a watermarking module searches the executable code for the presence of optimized code for unrolling a loop. If the current signature digit has a first binary value then the optimized code is replaced by non-optimized code to encode the first binary value in the watermark.

In another embodiment of the invention, watermarked executable code is searched for the presence of optimized and non-optimized code segments. If a non-optimized code segment is detected then a current signature digit is assigned the first binary value. If an optimized code segment is detected the current signature digit is assigned the second binary value.

Other features and advantages of the invention will be apparent in view of the following detailed description and appended drawings.

DETAILED DESCRIPTION OF THE INVENTION

Figure 1:
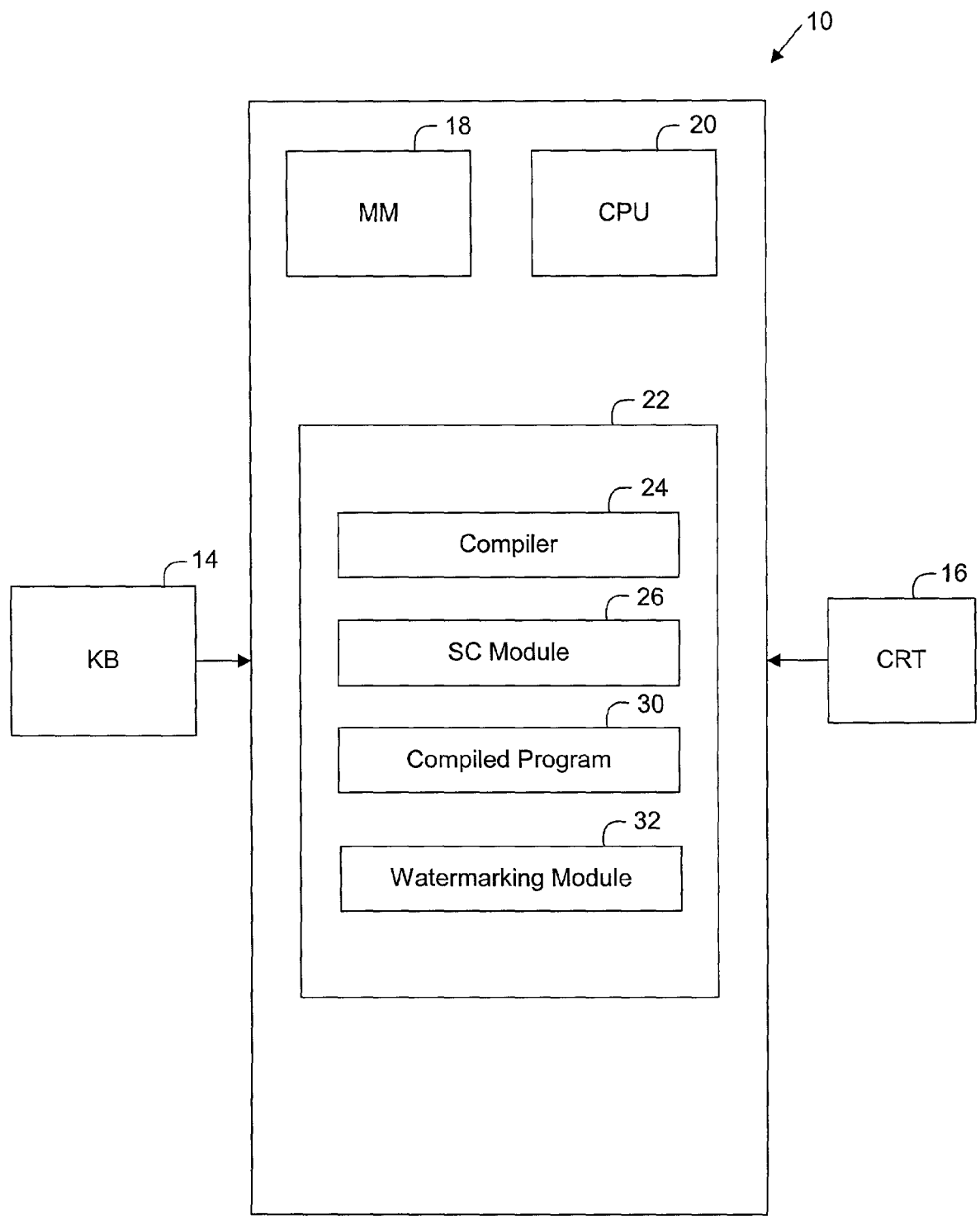
FIG. 1 is a block diagram of a computer system 10 configured to implement an embodiment of the invention.

The invention will now be described, by way of example not limitation, with reference to various embodiments. FIG. 1 is a block diagram of a computer system 10 configured to implement an embodiment of the invention. The computer system 10 includes a computer 12, an input device 14 such as a keyboard, and output device 16 such as a display screen. The computer 12 includes a main memory 18, which may include RAM and NVRAM, central processing unit ("CPU") 20, and a secondary memory 22. A compiler 24, a source code module 26, a compiled program 30, and a watermarking module 32 for inserting and retrieving the watermark from the compiled code 30 are stored in secondary memory 22.

Figure 2:
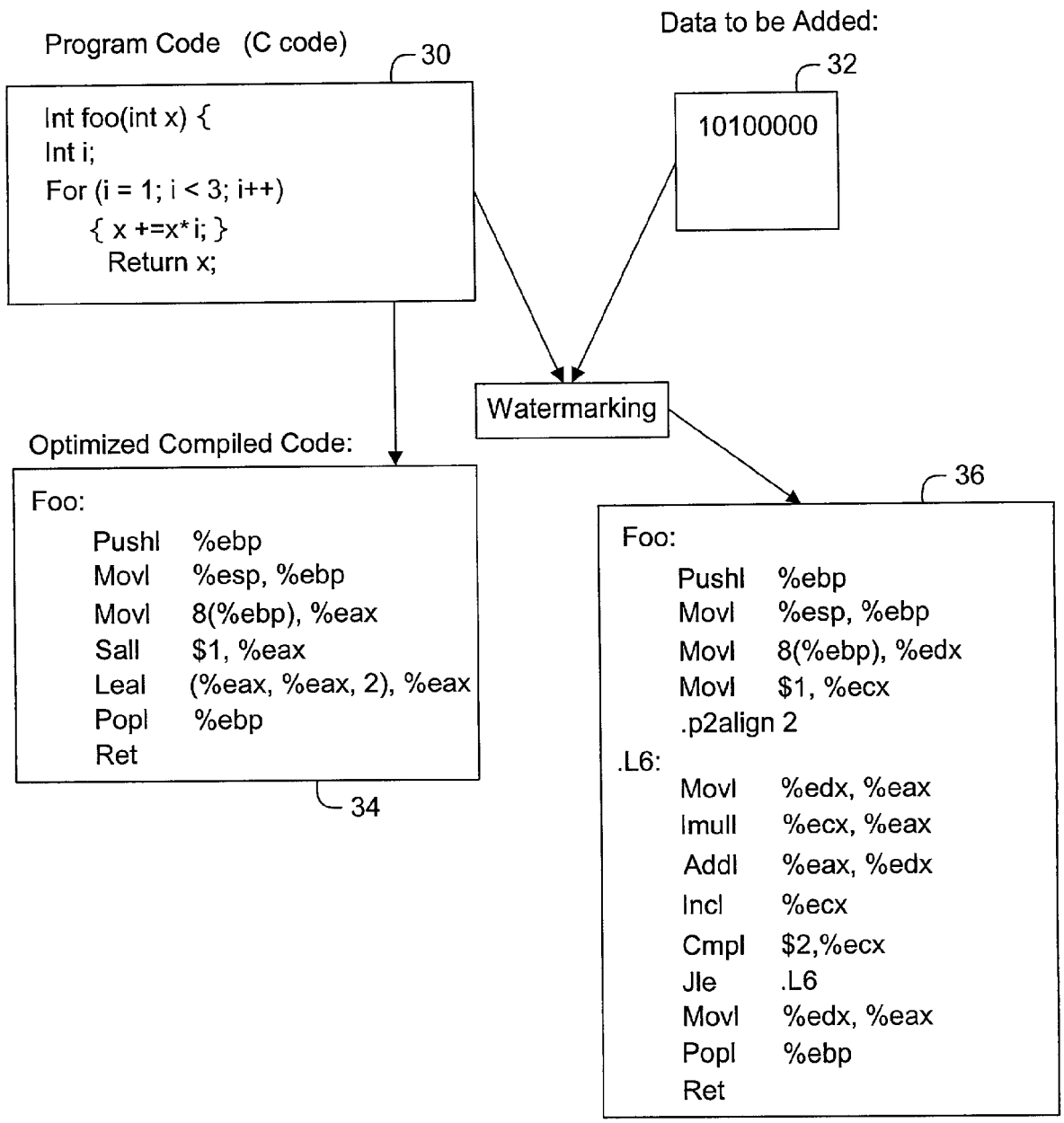
FIG. 2 is a block diagram depicting the operation of a first embodiment that encodes the watermark as a loop-unrolling non-optimization.

The operation of the first embodiment will now be described in more detail with reference to FIGS. 2-4. The general concept is to encode first and second bit values, e.g., 0 and 1, as either optimized or non-optimized code in the compiled program. For example, the presence of optimized code could encode the value "1" and the presence of non-optimized code could encode the value "0".

Generally, compilers optimize code by using techniques such as constant propagation (replacing expressions that evaluate to a constant with a constant value), copy propagation (replacing assignment by the assigned value) strength reduction (replacing operations by more efficient operations), loop unrolling (replace loop with code), and so on.

Modern compliers make many choices of methods to optimize code as they are compiling it. A method of watermarking code can be executed by changing the choice of optimizations that the compiler makes.

For example, take the following C code: for (i=1; i<3; i++) {x+=x*i;}. Most compilers would "unroll" this code, producing an optimized object code segment as though the C code had been: x+=x*1; x+=x*2; x+=x*3; thus saving the cost of incrementing i. If instead, the compiler chose to not unroll the loop, the non-optimized code segment would represent one bit of watermarked information.

The process of watermarking will now be described in more detail with reference to FIGS. 2-4. FIG. 2 includes a first block 30 depicting the program code, a second block 32 depicting the signature data to be encoded as a watermark, a third block 34 depicting the optimized compiled code output by the compiler, and a fourth block 36 depicting the modified compiled code having a the value of the first bit of the signature data encoded therein.

Figure 3:
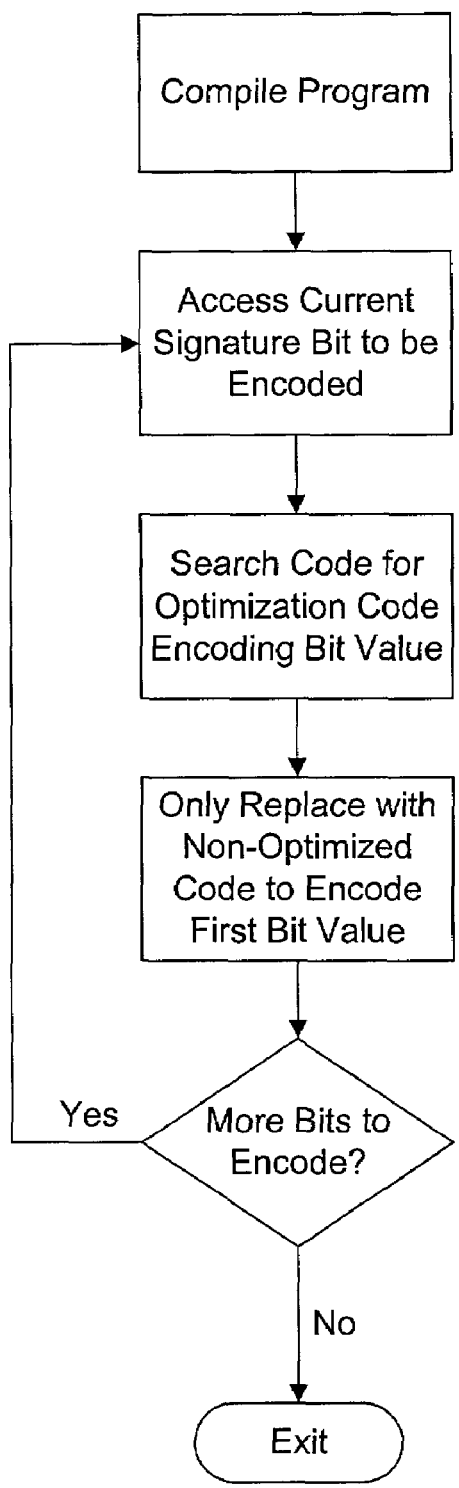
FIG. 3 is flowchart of the watermark encoding process of a an embodiment of the invention.

FIG. 3 is a flowchart depicting the acts performed to encode the signature as a watermark in the compiled code. The code is compiled to generate the compiled code 34 and the first bit of signature data 32, in this example having a value "1", is accessed. The compiled code is then searched for optimized code that will be used to encode this bit value.

In this example, the optimized code is depicted in the third block 34. This optimized code is replaced by non-optimized code as depicted in the fourth block 36. The presence of this non-optimized code encodes a bit value of "1" for the first digit in the watermark.

Subsequently, the second digit, "0", of the signature is then retrieved. The next instance of an unrolled loop would then be detected. In this case the optimized code would not be replaced by non-optimized code thereby encoding the bit value "0" for the second digit of the signature.

Thus, the values of the successive bits in the signature would be encoded into the program code as a series of blocks of optimized code and non-optimized code, with presence of optimized code encoding a first bit value and the presence of non-optimized code encoding a second bit value. The program loops until all the bit values in the signature have been encoded as a watermark into the compiled program.

The watermarked data can be retrieved by examining the data with a watermarking module that understands the compiler's optimization algorithm, and outputs the bits related to its non-optimal choices. This process will now be described with reference to FIG. 4.

Figure 4:
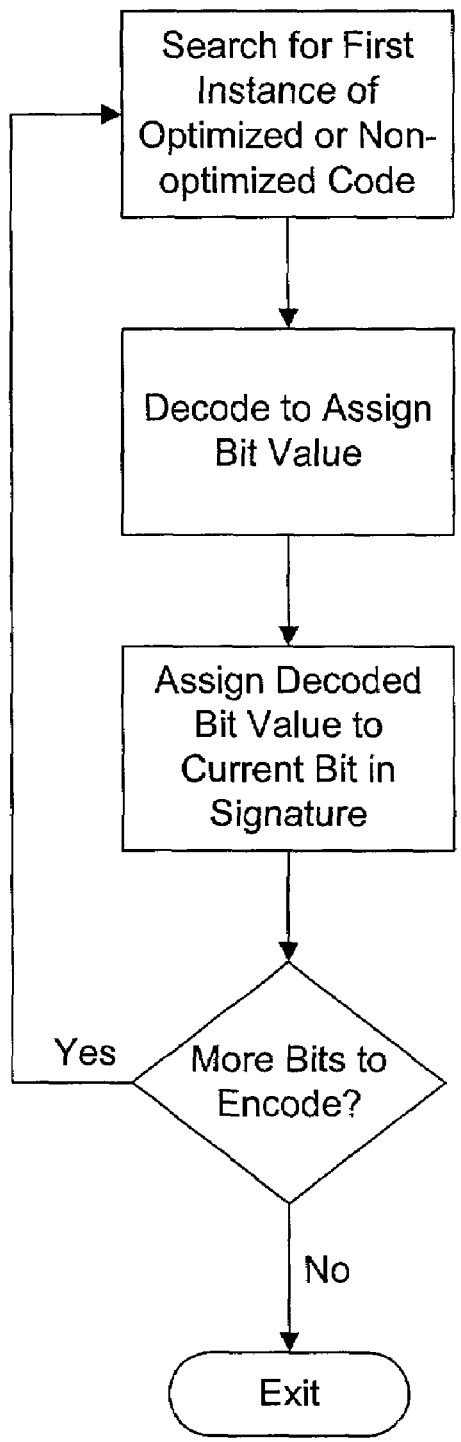
FIG. 4 is flowchart of the watermark decoding process of a an embodiment of the invention.

Referring to FIG. 4, the watermarked code is searched for the presence of optimized code or substituted non-optimized code. If non-optimized code is detected then a first bit value is assigned to current digit of the signature and if optimized code is detected then a second bit value is assigned to the current digit of the signature. The program loops until all the selected optimizations and non-optimizations have been decoded.

In the above example, both bit values were encoded by detecting whether a loop unroll had been optimized. Other optimizations, for example constant replacement, can be utilized in the same manner. Alternatively, a combination of optimizations can be utilized to encode the bit values, for example a loop unroll and constant replacements. The presence of the optimized code encodes one bit value and presence of the non-optimized code encodes the other bit value.

The invention has now been described with reference to the preferred embodiments. Alternatives and substitutions will now be apparent to persons of ordinary skill in the art. For example, other optimizations than the specific examples described can be utilized to encode the bit values. Additionally, the encoding and decoding processes can be incorporated as part of the compiler or be implemented as independent processes. Accordingly, it is not intended to limit the invention except as provided by the appended claims.

What is claimed is:

1. A computer-implemented method for generating executable computer code that is encoded with a watermark, the method comprising:

receiving, by a processor, program code that is not compiled;

receiving the watermark that includes a plurality of binary digits;

compiling the program code to generate compiled code that includes a first optimized code segment that includes one or more instructions and is associated with a first binary digit included in the watermark and a second optimized code segment that includes one or more instructions and is associated with a second binary digit included in the watermark;

determining that the first binary digit has a value equal to a first value and, based on the determination, replacing the first optimized code segment with a first non-optimized code segment that includes at least one additional instruction relative to the one or more instructions included in the first optimized code segment;

determining that the second binary digit has a value equal to a second value and, based on the determination, not replacing the second optimized code segment with a second non-optimized code segment;

searching the compiled code for the presence of either the first optimized code segment or the first non-optimized code segment;

upon locating the first non-optimized code segment, setting a first decoded binary digit to have a value equal to the first value;

searching the compiled code for the presence of either the second optimized code segment or the second non-optimized code segment; and upon locating the second optimized code segment, setting a second decoded binary digit to have a value equal to the second value.

2. The method of claim 1, wherein the step of compiling the program code includes performing a loop unroll optimization to generate the first optimized code segment.

3. The method of claim 1, wherein the step of compiling the program code includes performing a constant propagation optimization to generate the first optimized code segment, wherein performing the constant propagation optimization includes replacing expressions that evaluate to a constant with a constant value.

4. The method of claim 1, wherein the step of compiling the program code includes performing a copy propagation optimization to generate the first optimized code segment.

5. The method of claim 1, wherein the step of compiling the program code includes performing a strength reduction optimization to generate the first optimized code segment, wherein performing the strength reduction optimization includes replacing at least one operation with a more efficient operation.

6. A computer-readable storage medium storing instructions that, when executed by a processor, cause a computer system to generate executable computer code that is encoded with a watermark, by performing the steps of:

receiving program code that is not compiled;

receiving the watermark that includes a plurality of binary digits;

compiling the program code to generate compiled code that includes a first optimized code segment that includes one or more instructions and is associated with a first binary digit included in the watermark and a second optimized code segment that includes one or more instructions and is associated with a second binary digit included in the watermark;

determining that the first binary digit has a value equal to a first value and, based on the determination, replacing the first optimized code segment with a first non-optimized code segment that includes at least one additional instruction relative to the one or more instructions included in the first optimized code segment;

determining that the second binary digit has a value equal to a second value and, based on the determination, not replacing the second optimized code segment with a second non-optimized code segment;

searching the compiled code for the presence of either the first optimized code segment or the first non-optimized code segment;

upon locating the first non-optimized code segment, setting a first decoded binary digit to have a value equal to the first value;

searching the compiled code for the presence of either the second optimized code segment or the second non-optimized code segment; and upon locating the second optimized code segment, setting a second decoded binary digit to have a value equal to the second value.

7. The computer-readable storage medium of claim 6, wherein the step of compiling the program code includes performing a loop unroll optimization to generate the first optimized code segment.

8. The computer-readable storage medium of claim 6, wherein the step of compiling the program code includes performing a constant propagation optimization to generate the first optimized code segment, wherein performing the constant propagation optimization includes replacing expressions that evaluate to a constant with a constant value.

9. The computer-readable storage medium of claim 6, wherein the step of compiling the program code includes performing a copy propagation optimization to generate the first optimized code segment.

10. The computer-readable storage medium of claim 6, wherein the step of compiling the program code includes performing a strength reduction optimization to generate the first optimized code segment, wherein performing the strength reduction optimization includes replacing at least one operation with a more efficient operation.

11. A computer system for generating executable computer code that is encoded with a watermark, the system comprising:
- a processor; and
- a memory storing instructions configured to:
  - receive program code that is not compiled;
  - receive the watermark that includes a plurality of binary digits;
  - compile the program code to generate compiled code that includes a first optimized code segment that includes one or more instructions and is associated with a first binary digit included in the watermark and a second optimized code segment that includes one or more instructions and is associated with a second binary digit included in the watermark;
  - determine that the first binary digit has a value equal to a first value and, based on the determination, replace the first optimized code segment with a first non-optimized code segment that includes at least one additional instruction relative to the one or more instructions included in the first optimized code segment; and
  - determine that the second binary digit has a value equal to a second value and, based on the determination, not replace the second optimized code segment with a second non-optimized code segment;
  - search the compiled code for the presence of either the first optimized code segment or the first non-optimized code segment;
  - upon locating the first non-optimized code segment, set a first decoded binary digit to have a value equal to the first value;
  - search the compiled code for the presence of either the second optimized code segment or the second non-optimized code segment; and
  - upon locating the second optimized code segment, set a second decoded binary digit to have a value equal to the second value.

12. The computer system of claim 11, wherein compiling the program code includes performing a loop unroll optimization to generate the first optimized code segment.

13. The computer system of claim 11, wherein compiling the program code includes performing a constant propagation optimization to generate the first optimized code segment, wherein performing the constant propagation optimization includes replacing expressions that evaluate to a constant with a constant value.

14. The computer system of claim 11, wherein compiling the program code includes performing a copy propagation optimization to generate the first optimized code segment.

15. The computer system of claim 11, wherein compiling the program code includes performing a strength reduction optimization to generate the first optimized code segment, wherein performing the strength reduction optimization includes replacing at least one operation with a more efficient operation.

* * * * *